J. J. MILLER.
Condensing, Evaporating, and Cooling Apparatus.
No. 40,662. Patented Nov. 17, 1863.
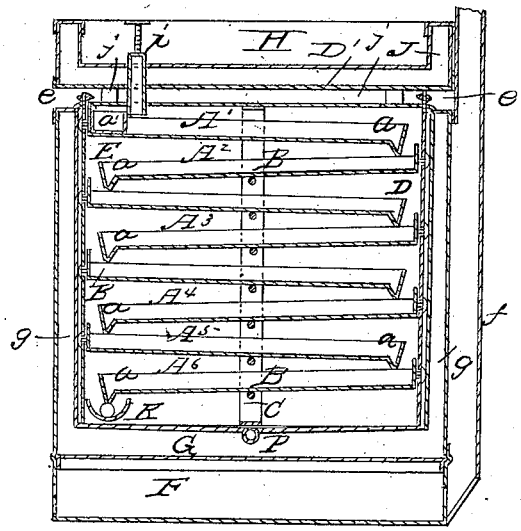
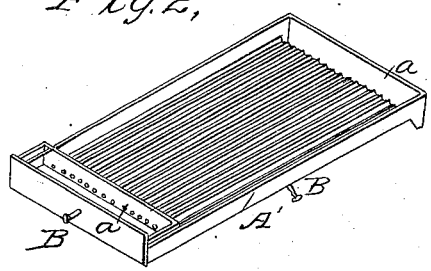
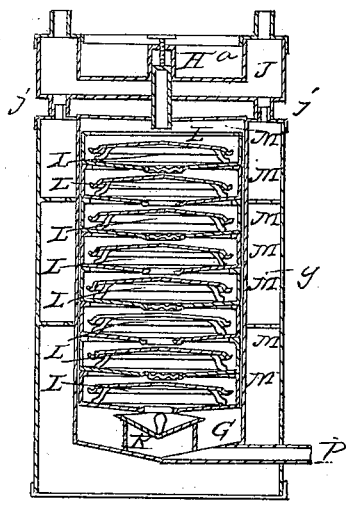
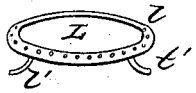

UNITED STATES PATENT OFFICE.

JOHN JACOB MILLER, OF CHICAGO, ILLINOIS, ASSIGNOR TO HIMSELF AND ERNST PRUSSING.

IMPROVED APPARATUS FOR CONDENSING, EVAPORATING, AND COOLING.

Specification forming part of Letters Patent No. 40,662, dated November 17, 1863.

*To all whom it may concern:*

Be it known that I, JOHN JACOB MILLER, of Chicago, in the county of Cook and State of Illinois, have invented a new and Improved Apparatus for Condensing, Evaporating, and Cooling Fluids; and I do hereby declare the following to be a full and exact description of the same, reference being had to the accompanying drawings, making part of this specification, in which—

Figure 1 is a vertical section of my improved apparatus. Fig. 2 is a perspective view of one of the pans, hereinafter to be described. Fig. 3 is a perspective of the apparatus in a modified form. Figs. 4, 5, 6, and 7 are perspective views of different forms of pans used with the form of apparatus shown in Fig. 3.

Similar letters of reference in the several figures indicate corresponding parts.

The apparatus will serve as an evaporator of saccharine juices, as a condenser of steam, as a cooler of liquids, and for several other purposes not here enumerated.

It consists of a series of plates or pans, one being placed directly under the other, and so constructed and inserted into a suitable vessel that the liquid to be evaporated or cooled—or, in case of the condenser, the injection-water—will, from the port through which it enters at top, first fall into a perforated trough, next upon the uppermost pan, and by its own gravity and the construction of the pan cover the whole surface of the same until it reaches its lowest part, where another perforated trough will receive it and equalize its flow. From there it will drip onto the next plate or pan below, when the same process is repeated, and so on throughout the whole series of plates or pans until the liquid is below gathered by a funnel and carried out of the vessel. The funnel is not used in case of the cooler or condenser; but in an evaporator it will be found very useful, as it prevents the evaporated liquid from touching at any point the steam or fire heated surface of the vessel. The pans may be of various shapes, round or oblong. The rectangular oblong pan is the cheapest to construct, and probably the most practical. If the round form be selected, the first pan will be level or slightly convex, (or, in case rotary motion be applied to the pans, it may be even slightly concave,) and somewhat smaller in diameter than the next pan, which may either be concave, so as to gather the liquid and convey it to the center part of the pan, or may consist of a flat bottom and a rim around it sufficiently high to gather the liquid. This larger pan will be provided with a perforated or spouted trough surrounding its center, through which the liquid will drip onto the center part of the next smaller plate, distributing itself over the whole surface until it reaches the perforated trough surrounding this pan at its outer edge, and so forth. The ventilation of the vessel is effected through openings both in its top and bottom, or near the same, and holes in the center of the larger pans. The air entering from below by atmospheric pressure, being driven in by means of a fan or pump, will go through the center holes of the larger pans and around the edges of the smaller pans until it leaves the vessel in a stream through the upper opening. If pans of rectangular form be employed, they will be made all alike, each having a level bottom, a rim all around, and a perforated trough at one edge. Having placed the lowest pan with its trough to the left, the next pan will be placed with its trough to the right, and so on alternately throughout the series. The bottoms of the pans may be smooth; but it is preferred to corrugate them lengthwise in order to procure an even flow of the liquid upon the pans; and all the pans are near their center hung loosely in a frame, so as to balance, and to be easily taken out for cleaning, and are provided with small projections at the end opposite the trough, which projections enter a common rod. The alternate position of the pans will require two such rods, these two rods reaching with their upper ends through the top of the vessel, and threaded at their top, and held in their position by nuts on top of the vessel. By turning these nuts one way or the other the rods may be raised or lowered, thus raising or lowering the ends of the pans, and therefore adjusting the flow of the liquid. The pans are so hung as to leave an open space between their ends provided with the troughs and the wall of the inner vessel, while the other sides may loosely fit such vessel. Thus the air entering through the lower ventilation-apertures will flow alternately from end to end of the apparatus in a serpentine course, passing in contact with both the upper and under surfaces of the pans, and leaving through the top openings, as already explained in reference to the round pans. The extraction of the vapor rising from the operation may be effected either by the pressure of the atmosphere creating a natural draft of air, or by means of a fan propelling the air into the vessel from below, or by an air-pump extracting the vapor at the top of the vessel. In cases where it is found desirable the air is freed from moisture by any suitable mechanical or chemical means, and afterward forced into the lower part of the evaporator, either hot or cold, and, becoming saturated with the vapors rising from the liquid, will carry them out at top. This previous drying of the air may be employed with great profit in saline works and in many other cases.

In order that others skilled in the art to which my invention appertains may be enabled to fully understand and use the same, I will proceed to describe its construction with reference to the drawings.

In Fig. 1 $A'$ $A^2$ $A^3$, &c., are a series of pans of precisely similar construction, each having a corrugated bottom, and at one end a transverse perforated trough, $a$. The said pans are supported by pins B, projecting from their opposite sides, and resting in slots $c$ of standards C, which are connected at their upper and lower ends, and rest upon the bottom of the inclosing-case D. The pans are also provided at their rear ends with pins $B'$, which rest in slotted hangers E, suspended adjustably from the cover $D'$ of the case D by means of screw-nuts $e$, so that the pans may be held at any angle of inclination. $a'$ is a perforated receiving-trough, extending across the upper end of the upper trough, $A'$.

In using the apparatus for a condenser or cooler, the injection-water or the liquid to be cooled is introduced in any suitable manner to the upper transverse perforated trough, $a'$, by which it is distributed over the corrugated bottom of the upper pan, down which it flows to the perforated trough $a$ at the lower end of the said pan. Through the perforations in the last-named trough the liquid is deposited uniformly across the upper end of the second pan, $A^2$, down which it flows in the manner before described, and so on from pan to pan, until it reaches the bottom, being constantly exposed to the steam or an upward blast of cold air, as the case may be, which is introduced through the pipe P.

For the purposes of an evaporator the following parts are added.

F is a furnace, of any suitable construction, communicating with a flue, $f$.

G is a water-space immediately above the furnace F, and communicating with a steam-jacket, $g$, which surrounds the evaporating-chamber containing the pans $A'$ $A^2$ $A^3$, &c.

H is a preheating or clarifying pan, in which the liquid is first introduced, and from which it is introduced to the trough $a'$, as needful, through a conducting-pipe, I, guarded by a cock, $i$.

J is a steam-jacket surrounding the pan H, and supplied with steam from the lower steam-jacket, $g$, through pipes $j$.

K is a funnel through which the concentrated liquid is drawn off.

The circular apparatus represented in Fig. 3 operates on a similar principle to that above described. The liquid descends from the heating-pan $H^a$ through the pipe $I^a$ onto the center of a flat or convex plate, L, which is surrounded by a trough, $l$, either perforated, as shown in Fig. 4, or corrugated, as shown in Fig. 6. By either means the liquid is distributed equally around the circumference of the bottom of the deep pan M, within which the plate is placed and suitably supported by legs $l'$. The sides of the pan M are sufficiently high to prevent any escape of liquid, and its bottom being concave the liquid flows inward to the center, where it is received by an annular trough, $m$, either perforated, as shown in Fig. 5, or corrugated, as shown in Fig. 7. By either means the liquid is distributed equally around the center of the plate L next below, upon which it flows radially outward in all directions, to be deposited in the next pan, $M'$, and so on throughout the series, and is deposited at bottom in a funnel, K, through which the liquid is drawn off. For the purposes of an evaporator, the steam-jackets $g$ and J (connected by pipes $j$) are employed, as before explained, and a blast of dried air, either hot or cold, is forced in through the pipe P, and rises in contact with the liquid and the exposed surfaces of the pans and plates. For a condenser or cooler the steam or air enters through the pipe P, as before stated, but the outer jacket may be dispensed with.

The plates or pans may be made of metal, wood, porcelain, or any other suitable material. The inner vessel should always be made of a material being a good conductor of heat, in case the evaporating medium be applied ouside of it, the outer vessel or jacket to suit the case.

The apparatus when used as evaporator may have the steam-jacket and a vessel under it to hold water, and under this a fire-place, as shown in Fig. 1, or the steam-jacket may be left off entirely, so as to heat the vessel directly from the fire-place under it. The chimney may run up on one side of the vessel, or wherever it is desirable. The funnel is necessary in an evaporator in order to prevent the evaporated liquid from coming into direct contact with the hot surface of the vessel, but with the cooler or condenser it is unnecessary.

The great superiority of this apparatus consists:

First. In affording the greatest possible evaporating or cooling surface within the smallest possible limits. This is realized by causing the liquid to spread over the entire surface of the plates and pans, and to flow in a serpentine course from the top to the bottom of the apparatus.

Second. In the means by me employed to prevent the liquid to be evaporated from being burned, thus preserving sweetness and clearness of the sirup.

Having thus described my invention, what I claim as new therein, and desire to secure by Letters Patent, is—

An apparatus for either or all the purposes named, consisting of corrugated or grooved pans or plates with inclined bottoms, constructed and supported as described, and arranged one above another within a close chamber, in the manner set forth.

JOHN JACOB MILLER.

Witnesses:
ERNST PRUSSING,
CHARLES BROS.